(12) United States Patent
Sugawara et al.

(10) Patent No.: US 12,410,791 B2
(45) Date of Patent: Sep. 9, 2025

(54) FUEL SUPPLY SYSTEM AND FUEL SUPPLY METHOD FOR AIRCRAFT GAS TURBINE ENGINE

(71) Applicant: IHI CORPORATION, Tokyo (JP)

(72) Inventors: Hirotaka Sugawara, Tokyo (JP); Naoki Seki, Tokyo (JP)

(73) Assignee: IHI CORPORATION, Tokyo (JP)

( * ) Notice: Subject to any disclaimer, the term of this patent is extended or adjusted under 35 U.S.C. 154(b) by 0 days.

(21) Appl. No.: 18/895,487

(22) Filed: Sep. 25, 2024

(65) Prior Publication Data

US 2025/0012274 A1 Jan. 9, 2025

Related U.S. Application Data

(63) Continuation of application No. PCT/JP2022/028599, filed on Jul. 25, 2022.

(51) Int. Cl.
*F04C 2/08* (2006.01)
*F02C 7/232* (2006.01)
(Continued)

(52) U.S. Cl.
CPC ............. *F04C 2/084* (2013.01); *F02C 7/232* (2013.01); *F04C 14/08* (2013.01); *F04C 14/12* (2013.01); *F04C 14/24* (2013.01); *F04C 2270/58* (2013.01)

(58) Field of Classification Search
CPC .......... F04C 2/084; F04C 14/08; F04C 14/12; F04C 14/24; F04C 2270/58; F02C 9/263; F02C 9/28; F02C 9/30; F02C 7/232
See application file for complete search history.

(56) References Cited

U.S. PATENT DOCUMENTS 5,685,268 A * 11/1997 Wakemen ............. F02B 77/088
123/198 D
6,182,438 B1 * 2/2001 Weber ....................... F02C 9/28
60/790
(Continued)

FOREIGN PATENT DOCUMENTS

JP 2012-117391 A 6/2012
JP 2013-231406 A 11/2013
(Continued)

OTHER PUBLICATIONS

International Search Report issued Oct. 11, 2022 in PCT/JP2022/028599 filed on Jul. 25, 2022, 2 pages.

*Primary Examiner* — Theresa Trieu
(74) *Attorney, Agent, or Firm* — Oblon, McClelland, Maier & Neustadt, L.L.P.

(57) ABSTRACT

A fuel supply system includes a gear pump, and a minimum pressurizing check valve including a cylinder and a piston that partitions the internal space of the cylinder into a first chamber that communicates with the metering section and a second chamber that communicates with a system inlet, the piston is spring-biased in a direction toward the first chamber, a side wall of the cylinder is provided with an outflow port having an opening degree adjusted as the piston moves back and forth, the minimum pressurizing check valve keeps a differential pressure between the system inlet and the outlet of the metering section constant when the rotation speed of the gear pump is equal to or more than a lower threshold and is equal to or less than an intermediate threshold.

2 Claims, 3 Drawing Sheets

(51) Int. Cl.
    *F04C 14/08*    (2006.01)
    *F04C 14/12*    (2006.01)
    *F04C 14/24*    (2006.01)

(56) References Cited

U.S. PATENT DOCUMENTS

| | | |
|---|---|---|
| 7,481,102 B2 | 1/2009 | Bickley |
| 2004/0177602 A1 | 9/2004 | Griffiths et al. |
| 2008/0028742 A1* | 2/2008 | Parsons .................... F02C 9/30 |
| | | 60/734 |
| 2010/0115959 A1* | 5/2010 | Anson ....................... F02C 9/30 |
| | | 60/734 |
| 2015/0337734 A1 | 11/2015 | Chalaud |
| 2017/0321608 A1* | 11/2017 | Crowley ................. F02C 7/232 |
| 2020/0340408 A1 | 10/2020 | Yamamoto et al. |
| 2020/0400074 A1 | 12/2020 | Seki et al. |

FOREIGN PATENT DOCUMENTS

| | | |
|---|---|---|
| JP | 2022-122754 A | 8/2022 |
| WO | WO 2019/097894 A1 | 5/2019 |
| WO | WO 2019/172372 A1 | 9/2019 |

\* cited by examiner

FUEL SUPPLY SYSTEM AND FUEL SUPPLY METHOD FOR AIRCRAFT GAS TURBINE ENGINE

TECHNICAL FIELD

The present disclosure relates to a fuel supply system for an aircraft gas turbine engine, and particularly to a fuel supply system configured to control a fuel flow rate by controlling a rotation speed of an electric motor that drives a pump, the fuel supply system being configured to control the rotation speed of the electric motor such that a deviation between an estimated value and a target value becomes zero by identifying an internal leak model of the pump during a low fuel flow rate and taking the amount of internal leakage of the pump estimated based on the model into consideration during a high fuel flow rate. Further, the present disclosure relates to a fuel supply method using the fuel supply system having such a configuration.

BACKGROUND ART

A fuel supply system for an aircraft gas turbine engine is a system that supplies fuel from a fuel tank installed, for example, in a main wing of an aircraft, to a fuel nozzle installed in a combustor of a gas turbine engine (for example, a turbofan engine) mounted on the aircraft, at a predetermined flow rate depending on operating conditions of the gas turbine engine.

The fuel supply system includes a pump used to increase pressure of the fuel, but the pump normally includes a low-pressure pump configured as a non-positive displacement pump (for example, a centrifugal pump) and a high-pressure pump configured as a positive displacement pump (for example, a gear pump).

These pumps have conventionally been driven by power extracted from a main shaft of the gas turbine engine through an AGB (Accessory Gear Box). However, in recent years, electrification of aircraft gas turbine engines has been actively promoted to prevent global warming, and a fuel supply system configured to drive the above-described pump with an electric motor is being studied.

Patent Document 1 discloses a fuel supply system for an aircraft gas turbine engine configured to control a fuel flow rate by controlling a rotation speed of an electric motor that drives a pump.

The fuel supply system includes an orifice flowmeter on a downstream side of the high-pressure pump, and controls the rotation speed of the electric motor, which drives the pump, such that the deviation between the value of the fuel flow rate measured by the orifice flowmeter and the target value becomes zero during the low fuel flow rate. However, since a front-back differential pressure of the orifice flowmeter rapidly increases in proportion to the square of the fuel flow rate with the increase of the fuel flow rate, a large pump with a very large boosting capability is required when the orifice flowmeter is to be used to measure the fuel flow rate over the entire range of fuel flow rate. This results in an increase in weight, and thus it is undesirable for a fuel supply system for an aircraft gas turbine engine requiring weight reduction.

Therefore, the fuel supply system is configured such that some parts of fuel flows bypassing the orifice flowmeter during the high fuel flow rate. In this state, the fuel flow rate is estimated based on the rotation speed of the high-pressure pump, and the rotation speed of the electric motor for driving the pump is controlled such that the deviation between the estimated value and the target value becomes zero.

However, the high-pressure pump serving as a component of the fuel supply system is configured as a gear pump, and internal leakage gradually increase with a deterioration over time. For this reason, in order to control the fuel flow rate with high accuracy during the high fuel flow rate, it is necessary to calculate the estimated value of the fuel flow rate by taking the internal leakage into consideration.

Accordingly, in the fuel supply system disclosed in Patent Document 1, identification of the internal leak model of the high-pressure pump is performed using the value of the fuel flow rate measured by the orifice flowmeter, during the low fuel flow rate at which a ratio of the amount of internal leakage to a discharge flow rate is high. The amount of internal leakage estimated based on the internal leak model is taken into consideration when the estimated value of the fuel flow rate is calculated based on the rotation speed of the high-pressure pump during the high fuel flow rate.

RELATED ART DOCUMENT

Patent Document

Patent Document 1: International Publication No. WO 2019-172372

SUMMARY OF THE DISCLOSURE

Problems to be Solved by the Disclosure

An object of the present disclosure is to provide a fuel supply system for an aircraft gas turbine engine, which is formed to control a fuel flow rate by controlling a rotation speed of an electric motor for driving a pump, and to perform identification of an internal leak model of a high-pressure pump with high accuracy in a configuration different from that of Patent Document 1. Further, the present disclosure is to provide a fuel supply method using the fuel supply system having such a configuration.

Means for Solving the Problems

In order to solve the above problems, a first aspect of the present disclosure is directed to a fuel supply system including: a gear pump that increases a pressure of fuel flowing in from a system inlet and discharges the fuel; a metering section that is disposed downstream of the gear pump and includes an orifice and a check valve connected in parallel with each other; a minimum pressurizing check valve that is disposed between the metering section and a system outlet; and a controller, wherein the check valve closes when a rotation speed of the gear pump is less than an upper threshold, and opens when the rotation speed of the gear pump is equal to or more than the upper threshold, the minimum pressurizing check valve includes a cylinder and a piston capable of being movable back and forth in the cylinder, the cylinder has an internal space partitioned by the piston into a first chamber that communicates with an outlet of the metering section through an inflow port and a second chamber that communicates with the system inlet, the piston receiving a force in a direction toward the first chamber from a spring disposed in the second chamber, a side wall of the cylinder is provided with an outflow port that is an opening through which the inflow port and the system outlet communicate with each other, an opening degree of the outflow port is adjusted as the piston moves back and forth, and the minimum pressurizing check valve keeps a differential pressure between the system inlet and the outlet of the metering section constant when the rotation speed of the gear pump is equal to or more than a lower threshold and is equal to or less than an intermediate threshold, the lower threshold being smaller than the upper threshold, the intermediate threshold being more than the lower threshold and smaller than the upper threshold.

Effects of the Disclosure

According to a fuel supply system of the present disclosure, it is possible to identify an internal leak model with high accuracy, which is an excellent effect.

MODE FOR CARRYING OUT THE DISCLOSURE

Hereinafter, an embodiment of the present disclosure will be described in detail with reference to the drawings.

Figure 1:
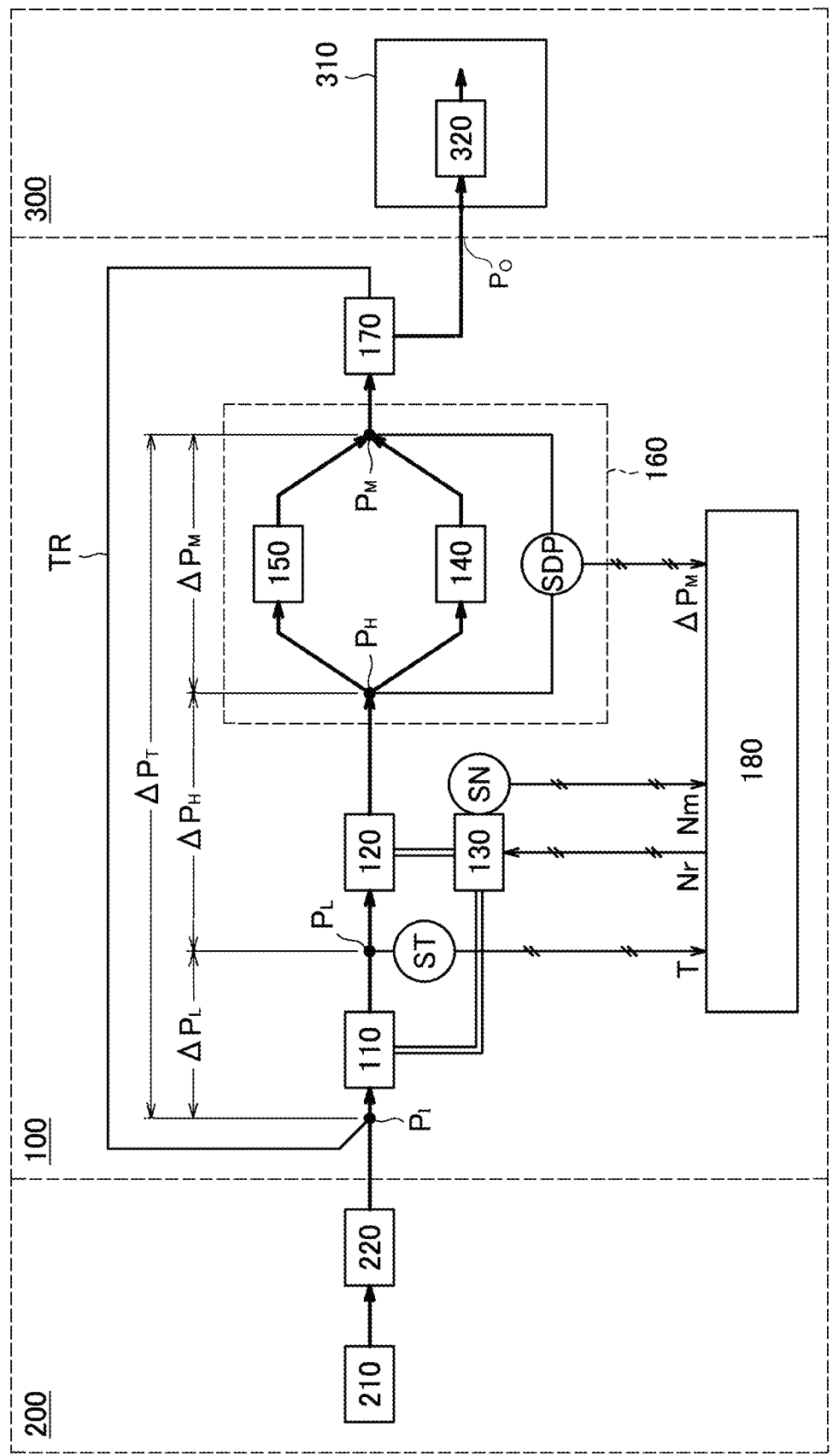
FIG. 1 is a block diagram showing a configuration of a fuel supply system for an aircraft gas turbine engine according to an embodiment of the present disclosure.

FIG. 1 is a block diagram showing a configuration of a fuel supply system for an aircraft gas turbine engine according to an embodiment of the present disclosure.

A fuel supply system 100 is a system for supplying fuel, which is supplied through a boost pump 220 from a fuel tank 210 provided in, for example, a main wing of an aircraft 200, to a fuel nozzle 320 installed in a combustor 310 of a gas turbine engine 300 (for example, a turbofan engine) at a predetermined flow rate depending on operating conditions of the gas turbine engine 300.

The fuel supply system 100 includes, as main components, a low-pressure pump 110, a high-pressure pump 120, an electric motor 130, a metering section 160 including an orifice 140 and a pressurizing valve 150, a minimum pressurizing check valve (MPCV) 170, and a fuel supply controller (controller) 180. In addition to these components, the fuel supply system 100 conventionally includes a fuel filter, a fuel cooled oil cooler (FCOC), and the like, which are not directly related to the present disclosure and thus not shown.

The low-pressure pump 110 is a pump that increases pressure of fuel supplied from the fuel tank 210 of the aircraft 200 through the boost pump 220 and feeds the fuel to the high-pressure pump 120. The low-pressure pump 110 is configured as a non-positive displacement pump (for example, a centrifugal pump), and is driven by the electric motor 130.

The high-pressure pump 120 is a pump that increases pressure of the fuel supplied from the low-pressure pump 110 and feeds the fuel to a downstream side. The high-pressure pump 120 is configured as a positive displacement pump (for example, a gear pump), and is driven by the electric motor 130. A temperature sensor ST is provided at a point $P_L$ on a fuel flow passage between the low-pressure pump 110 and the high-pressure pump 120, and a signal of a fuel temperature T at an inlet of the high-pressure pump 120 measured by the temperature sensor ST is transmitted to the fuel supply controller 180.

Power may be transferred from the electric motor 130 to the low-pressure pump 110 and the high-pressure pump 120 in any manner. Further, the low-pressure pump 110 and the high-pressure pump 120 may be driven by individual electric motors, respectively, instead of being driven by one common electric motor 130.

The electric motor 130 has the function of driving the low-pressure pump 110 and the high-pressure pump 120 as described above. A rotation speed sensor SN is attached to the electric motor 130, and a signal of a rotation speed $N_m$ measured by the rotation speed sensor SN is transmitted to the fuel supply controller 180. Further, the rotation speed of the electric motor 130 is controlled by a rotation speed command signal $N_r$ output from the fuel supply controller 180.

A branch (point $P_H$) is provided downstream of the high-pressure pump 120, and the metering section 160, which includes the orifice 140 and the pressurizing valve 150 connected in parallel with each other, is disposed downstream of the branch.

The orifice 140 forms an orifice flowmeter together with a differential pressure gauge SDP connected in parallel with the orifice 140 (the flowmeter being used to measure a flow rate based on a flow passage (parallel flow passage) in which the orifice 140 and the differential pressure gauge SDP are disposed, which are connected in parallel with each other. The parallel flow passage being provided in parallel with the pressurizing valve 150 (check valve) through the above-described branch). As will be described below, the orifice flowmeter has a function of measuring a fuel flow rate in a state where the pressurizing valve 150 connected in parallel with the orifice 140 is closed, and for this purpose, a signal of a front-back differential pressure $\Delta P_M$ of the orifice 140 measured by the differential pressure gauge SDP is transmitted to the fuel supply controller 180.

When the fuel flow rate flowing into the metering section 160 is low (during a low fuel flow rate), the pressurizing valve 150 is in a closed state. In this state, all of the fuel flowing into the metering section 160 passes through the orifice 140, and the fuel flow rate is measured (metered) by the orifice flowmeter including the orifice 140 and the differential pressure gauge SDP as described above.

On the other hand, when the fuel flow rate flowing into the metering section 160 increases, the front-back differential pressure of the orifice 140 also increases, and when the differential pressure exceeds a threshold inherent to the pressurizing valve 150 which is a check valve, the pressurizing valve 150 is in an open state. In this state, a total fuel flow rate supplied from the fuel supply system 100 to the fuel nozzle 320 of the gas turbine engine 300 cannot be measured by the orifice flowmeter described above. Therefore, in this state, the total fuel flow rate is estimated based on the rotation speed of the electric motor 130 that drives the high-pressure pump 120, as will be described below.

The minimum pressurizing check valve 170 is provided downstream of the parallel flow passage described above, and is a valve having a function of keeping a differential pressure $\Delta P_T$ (see FIG. 1) between an inlet (point $P_I$) of the fuel supply system 100 and an outlet (point $P_M$) of the metering section 160 constant during a low fuel flow rate at which identification of an internal leak model of the high-pressure pump 120 is performed, as will be described below, but a structure thereof will first be described below.

Figure 2:
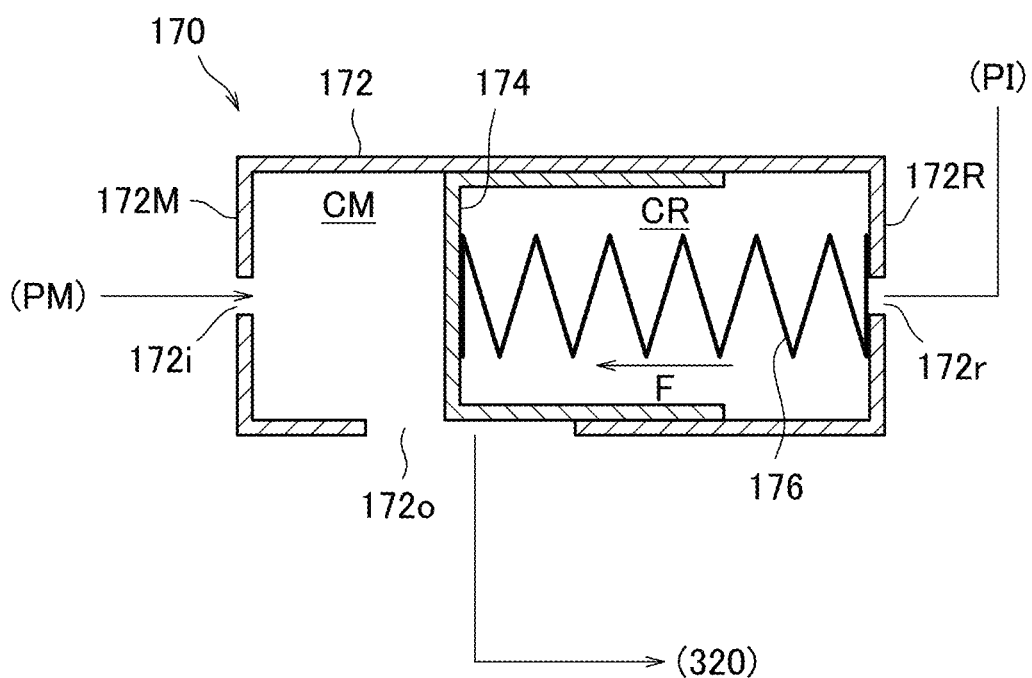
FIG. 2 is a schematic explanatory diagram showing a structure of a minimum pressurizing check valve provided in the fuel supply system for the aircraft gas turbine engine according to the embodiment of the present disclosure.

FIG. 2 is a schematic explanatory diagram showing a structure of the minimum pressurizing check valve 170.

The minimum pressurizing check valve 170 includes, as main components, a cylinder 172 and a piston 174.

The cylinder 172 is formed into a hollow cylindrical shape, and is provided with a main fuel inflow port (inflow port) 172i and a reference fuel port 172r at a first end 172M and a second end 172R (indicating a left end and a right end in the drawing, respectively), respectively, in an axial direction of the cylinder. Further, a main fuel outflow port (outflow port) 172o, which is an opening extending in the axial direction, is provided in a side wall of the cylinder.

The main fuel inflow port 172i communicates with the outlet (point $P_M$) of the metering section 160, and receives the fuel that has been increased in pressure by the low-pressure pump 110 and the high-pressure pump 120 and has passed through the metering section 160. In addition, the main fuel outflow port 172o communicates with the fuel nozzle 320 (through the outlet $P_O$ of the fuel supply system 100), and flows out the fuel received through the main fuel inflow port 172i to the fuel nozzle 320 of the gas turbine engine 300. Furthermore, the reference fuel port 172r communicates with the inlet (point $P_1$ (reference pressure acquisition portion)) of the fuel supply system 100 through a reference fuel pipe TR (see FIG. 1) to acquire a reference pressure upstream of the pump (high-pressure pump 120).

The piston 174 is disposed inside the cylinder 172 and is formed to be movable back and forth in the axial direction of the cylinder 172 in a state where an outer peripheral surface thereof comes into airtight contact with an inner peripheral surface of the cylinder 172. The piston 174 partitions an internal space of the cylinder 172 into a main fuel chamber CM (first chamber) on a first end 172M side (left side in the drawing) and a reference fuel chamber CR (second chamber) on a second end 172R side (right side in the drawing). A spring 176 is disposed in the reference fuel chamber CR to connect the piston 174 to the second end 172R of the cylinder 172, and the spring 176 applies a force F to the piston 174 in a direction from the second end 172R toward the first end 172M of the cylinder 172.

In the minimum pressurizing check valve 170 configured as described above, depending on fluctuations in the pressure (pressure of the inflowing fuel) in the main fuel chamber CM and the pressure (reference pressure) in the reference fuel chamber CR, the piston 174 moves to an equilibrium position where a force (restoration force) caused by a differential pressure between the both pressures and the force F applied from the spring 176 (restoration force applying member) are balanced, whereby the opening degree (opening area) of the main fuel outflow port 172o (outflow port) extending in the axial direction is adjusted.

A specific mode of movement of the piston 174 will be described below with reference to FIG. 3. In the following description, it is assumed that the pressure at the inlet (point $P_I$) of the fuel supply system 100 and the pressure in the reference fuel chamber CR are substantially equal to each other and the pressure at the outlet (point $P_M$) of the metering section 160 and the pressure in the main fuel chamber CM are substantially equal to each other.

Figure 3A:
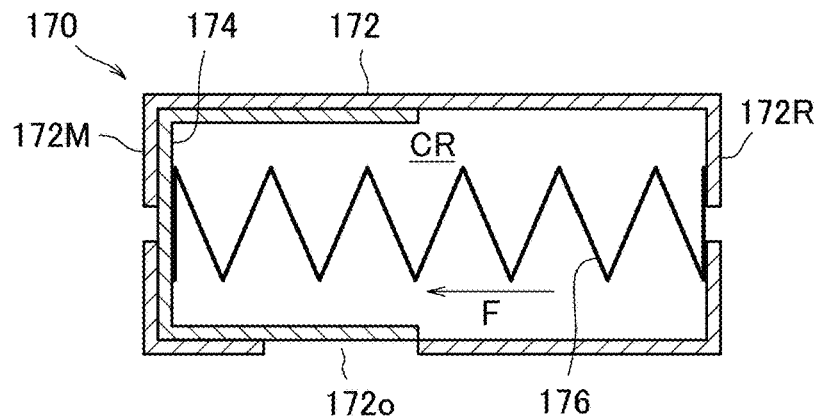
FIG. 3A is a schematic explanatory diagram showing a mode of movement of a piston of the minimum pressurizing check valve provided in the fuel supply system for the aircraft gas turbine engine according to the embodiment of the present disclosure.
Figure 3B:
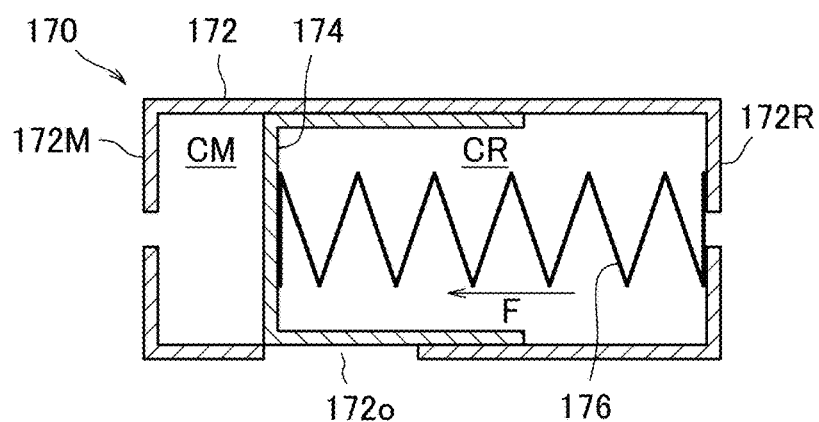
FIG. 3B is a schematic explanatory diagram showing a mode of movement of the piston of the minimum pressurizing check valve provided in the fuel supply system for the aircraft gas turbine engine according to the embodiment of the present disclosure.
Figure 3C:
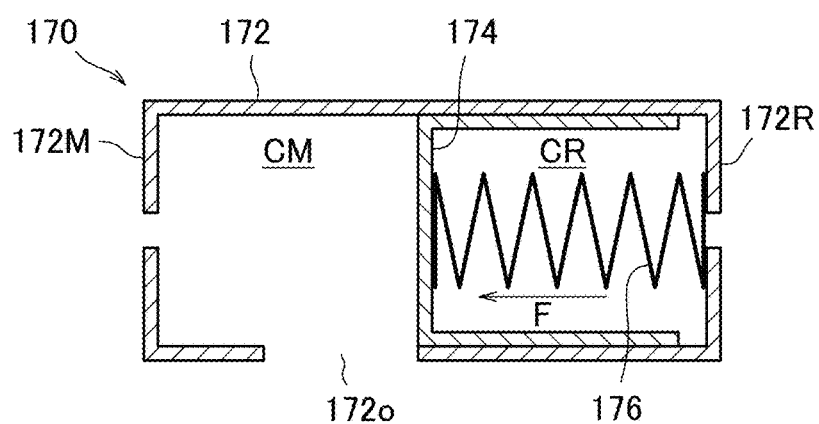
FIG. 3C is a schematic explanatory diagram showing a mode of movement of the piston of the minimum pressurizing check valve provided in the fuel supply system for the aircraft gas turbine engine according to the embodiment of the present disclosure.

In a state where the electric motor 130 is stopped and the low-pressure pump 110 and the high-pressure pump 120 are not operating, there is no difference between the pressure in the main fuel chamber CM and the pressure in the reference fuel chamber CR, and the piston 174 is pressed against the first end 172M of the cylinder 172 by the force F of the spring 176 (see FIG. 3A).

When the electric motor 130 starts up and the low-pressure pump 110 and the high-pressure pump 120 start operating, as loads on these two pumps (for example, the rotation speed of the electric motor 130) increases, the pressure in the main fuel chamber CM gradually increase, and when the force acting on the piston 174 due to the differential pressure from the pressure in the reference fuel chamber CR is in a state of overcoming the force F of the spring 176, the piston 174 starts moving toward the second end 172R of the cylinder 172. In such a state, the main fuel outflow port 172o of the cylinder 172 is closed by the piston 174, but the opening degree of the main fuel outflow port 172o at this time is expressed as a minus (less than 0%) opening degree for convenience herein.

When the rotation speed of the electric motor 130 increases and the amount of increase in pressure of the low-pressure pump 110 and the high-pressure pump 120 increases, the pressure in the main fuel chamber CM increases, and the main fuel outflow port 172o of the cylinder 172 begins to open (see FIG. 3B) at a point of time when the differential pressure from the pressure in the reference fuel chamber CR exceeds a first threshold $\Delta P_1$. In other words, when the above-described differential pressure is equal to the first threshold $\Delta P_1$, the opening degree of the main fuel outflow port 172o is 0%.

When the rotation speed of the electric motor 130 further increases and the amount of increase in pressure of the low-pressure pump 110 and the high-pressure pump 120 further increases, the pressure in the main fuel chamber CM further increases, and the main fuel outflow port 172o of the cylinder 172 becomes fully open (see FIG. 3C) at a point of time when the differential pressure from the pressure in the reference fuel chamber CR reaches a second threshold $\Delta P_2$. In other words, when the above-described differential pressure is equal to the second threshold $\Delta P_2$, the opening degree of the main fuel outflow port 172o is 100%.

In this way, when the differential pressure $\Delta P_T$ (see FIG. 1) between the pressure at the inlet (point $P_I$) of the fuel supply system 100 and the pressure at the outlet (point $P_M$) of the metering section 160 is the first threshold $\Delta P_1$ or more and the second threshold $\Delta P_2$ or less, that is, satisfies Formula (1) below, the minimum pressurizing check valve 170 is configured such that the opening degree of the main fuel outflow port 172o can be adjusted in a range of 0 to 100% by the piston 174.

$$\Delta P_1 \leq \Delta P_T \leq \Delta P_2 \qquad (1)$$

Here, assuming that due to a change in operating condition of the boost pump 220 of the aircraft 200, a discharge pressure of the boost pump 220 can fluctuate within a range of $\pm \Delta P_B$ ($\Delta P_B$: maximum deviation of the discharge pressure) based on a median of fluctuations to be assumed, a situation is considered in which the boost pump 220 is operating with its discharge pressure equal to the median of the fluctuations described above and the fuel supply system 100 is normally operating in a state of satisfying Formula (2) below (that is, the motor 130 is operating at a constant rotation speed).

$$\Delta P_1 + \Delta P_B \leq \Delta P_T \leq \Delta P_2 - \Delta P_B \tag{2}$$

In this situation, when the discharge pressure of the boost pump 220 is reduced by $\Delta P_B$, the pressure change propagates from the inlet (point $P_I$) of the fuel supply system 100 to the reference fuel chamber CR through the reference fuel pipe TR and the reference fuel port 172r. Then, since the pressure in the reference fuel chamber CR temporarily becomes lower by $\Delta P_B$ than the pressure in the main fuel chamber CM, the piston 174 being in the equilibrium position moves toward the second end 172R (toward the right in the drawing) against the force F of the spring 176. Thereby, since the opening degree of the main fuel outflow port 172o increases, the pressure in the main fuel chamber CM located upstream thereof is reduced. As a result, the differential pressure between the pressure in the main fuel chamber CM and the pressure in the reference fuel chamber CR returns to the state before the pressure in the reference fuel chamber CR is reduced, and the piston 174 also returns to the original equilibrium position.

Conversely, when the discharge pressure of the boost pump 220 increases by $\Delta P_B$, the pressure in the reference fuel chamber CR temporarily becomes higher by $\Delta P_B$ than the pressure in the main fuel chamber CM, and thus the piston 174 being in the equilibrium position moves toward the first end 172M (toward the left in the drawing). Thereby, since the opening degree of the main fuel outflow port 172o decreases, the pressure in the main fuel chamber CM located upstream thereof increases. As a result, the differential pressure between the pressure in the main fuel chamber CM and the pressure in the reference fuel chamber CR returns to the state before the pressure in the reference fuel chamber CR increases, and the piston 174 also returns to the original equilibrium position.

Here, when the differential pressure $\Delta P_T$ is equal to the maximum value $\Delta P_2 - \Delta P_B$ in the range defined by Formula (2) above, the piston 174 is in the equilibrium position where the opening degree of the main fuel outflow port 172o is slightly less than 100%. When the discharge pressure of the boost pump 220 is reduced by $\Delta P_B$ in this state, the differential pressure $\Delta P_T$ temporarily increases up to $\Delta P_2$, but at this time, the piston 174 moves to a position where the opening degree of the main fuel outflow port 172o is exactly equal to 100%. In this way, even when the differential pressure $\Delta P_T$ is equal to the maximum value in the range defined by Formula (2) above, the minimum pressurizing check valve 170 has the behavior that the piston 174 returns to its original equilibrium position as described above when the discharge pressure of the boost pump 220 is reduced.

Further, when the differential pressure $\Delta P_T$ is equal to the minimum value $\Delta P_1 + \Delta P_B$ in the range defined by Formula (2) above, the piston 174 is in the equilibrium position where the opening degree of the main fuel outflow port 172o is slightly more than 0%. When the discharge pressure of the boost pump 220 increases by $\Delta P_B$ in this state, the differential pressure $\Delta P_T$ is temporarily reduced up to $\Delta P_1$, but at this time, the piston 174 moves to a position where the opening degree of the main fuel outflow port 172o is exactly equal to 0%. In this way, even when the differential pressure $\Delta P_T$ is equal to the minimum value in the range defined by Formula (2) above, the minimum pressurizing check valve 170 has the behavior that the piston 174 returns to its original equilibrium position as described above when the discharge pressure of the boost pump 220 increases.

In this way, when the differential pressure $\Delta P_T$ between the pressure at the inlet (point $P_I$) of the fuel supply system 100 and the pressure at the outlet (point $P_M$) of the metering section 160 is within the range defined by Formula (2) above, the minimum pressurizing check valve 170 has the behavior of keeping the differential pressure $\Delta P_T$ constant even when the discharge pressure of the boost pump 220 of the aircraft 200 changes.

Therefore, the fuel supply system 100 is configured such that the internal leak model is identified, in the state where Formula (2) above is satisfied, to keep the differential pressure $\Delta P_T$ constant during a low fuel flow rate when the internal leak model of the high-pressure pump 120 is identified. This will be described below.

Here, referring again to FIG. 1, the operation of the fuel supply system 100 will be described.

The fuel supplied from the fuel tank 210 of the aircraft 200 through the boost pump 220 is sequentially increased in pressure by the low-pressure pump 110 and the high-pressure pump 120, and then flows into the metering section 160.

During the low fuel flow rate, the pressurizing valve 150 is in a closed state, and all of the fuel flowing into the metering section 160 passes through the orifice 140. At this time, the signal of the front-back differential pressure $\Delta P_M$ of the orifice 140 measured by the differential pressure gauge SDP connected in parallel with the orifice 140 is transmitted to the fuel supply controller 180, and a fuel flow rate $Q_M$ passing through the orifice 140 is calculated based on the relationship between the front-back differential pressure and the fuel flow rate.

On the one hand, the fuel flow rate calculated by the fuel supply controller 180 is compared with a target value of the fuel flow rate input from the controller of the gas turbine engine 300, and a rotation speed command signal $N_r$ is transmitted to the electric motor 130, which drives the low-pressure pump 110 and the high-pressure pump 120, to make the deviation between both flow rates zero. On the other hand, the fuel supply controller 180 uses the calculated fuel flow rate $Q_M$ to identify the internal leak model of the high-pressure pump 120. This will be described below.

The internal leak model of the high-pressure pump 120 is a model for calculating an internal leak area $A_{leak}$ of the high-pressure pump 120 using the fuel flow rate $Q_M$ described above, and is expressed by Formula (3) below.

[Equation 1]

$$A_{leak} = \frac{V_{th} \cdot N_H - Q_M}{Cd} \sqrt{\frac{\rho}{2 \Delta P_H}} \tag{3}$$

Where, $V_{th}$ represents a theoretical discharge volume (constant) of the high-pressure pump 120, $N_H$ represents the rotation speed of the high-pressure pump 120 (calculated from the rotation speed $N_m$ measured by the rotation speed sensor SN attached to the electric motor 130), Cd represents a flowrate coefficient (constant) of the high-pressure pump 120, ρ represents density of the fuel at the inlet of the high-pressure pump 120 (calculated from the fuel temperature T at the inlet of the high-pressure pump 120 measured by the temperature sensor ST), and $\Delta P_H$ represents the front-back differential pressure of the high-pressure pump 120.

The internal leak area $A_{leak}$ of the high-pressure pump 120 calculated based on the internal leak model is then used to calculate volumetric efficiency ηv of the high-pressure pump 120 using Formula (4) below.

[Equation 2]

$$\eta v = 1 - \frac{Cd \cdot A_{leak}}{V_{th} \cdot N_H} \sqrt{\frac{2\Delta P_H}{\rho}} \qquad (4)$$

The volumetric efficiency ηv of the high-pressure pump 120 calculated in this way is used to estimate the fuel flow rate (discharge flow rate of the high-pressure pump 120) $Q_H$ using Formula (5) below at the time of high fuel flow rate (that is, when the pressurizing valve 150 is in an open state).

$$Q_H = \eta v \cdot V_{th} \cdot N_H \qquad (5)$$

In the identification of the internal leak model of the high-pressure pump 120 described above, the front-back differential pressure $\Delta P_H$ of the high-pressure pump 120 is calculated by Formula (6) below.

$$\Delta P_H = \Delta P_T - (\Delta P_L + \Delta P_M) \qquad (6)$$

Here, $\Delta P_T$ represents the differential pressure between the pressure at the inlet (point $P_I$) of the fuel supply system 100 and the pressure at the outlet (point $P_M$) of the metering section 160, as described above, $\Delta P_L$ represents the amount of pressure increase in the low-pressure pump 110, and $\Delta P_M$ represents the front-back differential pressure of the metering section 160 (orifice 140) (see FIG. 1).

In these items, $\Delta P_L$ is estimated based on Formula (7) below using the rotation speed $N_m$ of the electric motor 130 that drives the low-pressure pump 110. Here, $f_L$ is a function of $N_m$, and is determined in advance by tests or the like.

$$\Delta P_L = f_L(N_m) \qquad (7)$$

Further, $\Delta P_M$ is measured by the differential pressure gauge SDP connected in parallel with the orifice 140.

On the other hand, according to the fuel supply system disclosed in Patent Document 1, $\Delta P_T$ can be calculated as a difference between the pressure at the inlet of the fuel supply system and the pressure at the outlet of the metering section which are measured by pressure sensors, respectively.

However, since these pressure sensors are not provided in the fuel supply system 100, $\Delta P_T$ is estimated based on Formula (8) below using the rotation speed $N_m$ of the electric motor 130 that drives the low-pressure pump 110 and the high-pressure pump 120, similarly to $\Delta P_L$. Here, $f_T$ is a function of $N_m$, and is determined in advance by tests or the like.

$$\Delta P_T = f_T(N_m) \qquad (8)$$

In the fuel supply system 100, the behavior of the minimum pressurizing check valve 170 described above is used in order to keep the differential pressure $\Delta P_T$ in Formula (6) constant such that the front-back differential pressure $\Delta P_H$ of the high-pressure pump 120 can be calculated with high accuracy using Formula (6) above when the identification of the internal leak model of the high-pressure pump 120 is performed.

As described above, when the differential pressure $\Delta P_T$ is within the range defined by Formula (2) above, the minimum pressurizing check valve 170 has the behavior to keep the differential pressure $\Delta P_T$ constant even when the discharge pressure of the boost pump 220 of the aircraft 200 changes.

Therefore, the fuel supply system 100 is configured such that the identification of the internal leak model of the high-pressure pump 120 can be performed when the rotation speed $N_m$ of the electric motor 130 satisfies Formula (9) below.

$$N_1 \leq N_m \leq N_2 \qquad (9)$$

Here, $N_1$ represents the rotation speed (lower threshold) of the electric motor 130 at which the differential pressure $\Delta P_T$ becomes equal to the minimum value $\Delta P_1 + \Delta P_B$ in the range defined by Formula (2) above, and $N_2$ represents the rotation speed (intermediate threshold) of the electric motor 130 at which the differential pressure $\Delta P_T$ becomes equal to the maximum value $\Delta P_2 - \Delta P_B$ in the range defined by Formula (2) above.

In order to realize the above-described configuration, the minimum pressurizing check valve 170 is configured such that the opening degree of the main fuel outflow port 172o can be variably adjusted in the range of 0 to 100% in the rotation speed range defined by Formula (9) above.

Specifically, the minimum pressurizing check valve 170 is designed to satisfy conditions (A) and (B) below (specifically, a dimension of each of the cylinder 172 and the piston 174 and a spring constant of the spring 176 are set).

(A) When the rotation speed $N_m$ of the electric motor 130 is equal to the minimum value $N_1$ in the range defined by Formula (9) above, the opening degree of the main fuel outflow port 172o is exactly 0% in the case where the pressure in the reference fuel chamber CR increases by $\Delta P_B$.

(B) When the rotation speed $N_m$ of the electric motor 130 is equal to the maximum value $N_2$ in the range defined by Formula (9) above, the opening degree of the main fuel outflow port 172o is exactly 100% in the case where the pressure in the reference fuel chamber CR is reduced by $\Delta P_B$.

When the rotation speed $N_m$ of the electric motor 130 reaches a rotation speed $N_3$ which is larger than the rotation speed $N_2$ described above, the front-back differential pressure of the orifice 140 increases as the fuel flow rate increases, and the differential pressure reaches the threshold inherent to the pressurizing valve 150 which is a check valve, whereby the pressurizing valve 150 begins to open.

In the state where the pressurizing valve 150 is open as described above, the fuel flow rate $Q_M$ passing through the orifice 140 no longer matches the total fuel flow rate supplied from the fuel supply system 100 to the fuel nozzle 320 of the gas turbine engine 300.

For this reason, in the state where the rotation speed $N_m$ of the electric motor 130 is equal to or higher than the rotation speed $N_3$ (upper threshold), using the internal leak model of the high-pressure pump 120 identified as described above, the fuel flow rate (discharge flow rate of the high-pressure pump 120) $Q_H$ is estimated based on Formulas (4) and (5) above, and the rotation speed of the electric motor 130 is controlled such that the deviation between the estimated value and the target value becomes zero.

Figure 3D:
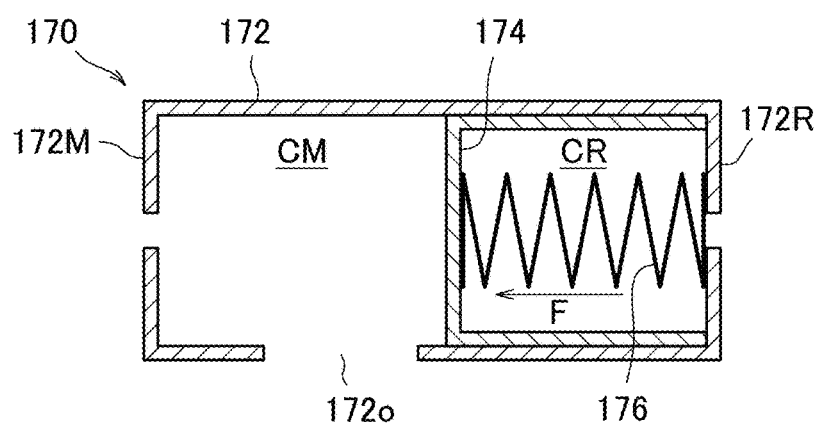
FIG. 3D is a schematic explanatory diagram showing a mode of movement of the piston of the minimum pressurizing check valve provided in the fuel supply system for the aircraft gas turbine engine according to the embodiment of the present disclosure.

In such a state, the piston 174 of the minimum pressurizing check valve 170 is pressed against the second end 172R of the cylinder 172, and the main fuel outflow port 172o of the cylinder 172 is fully open (see FIG. 3D). In the description, the opening degree of the main fuel outflow port 172o in this state is regarded as an opening degree larger than 100% for convenience.

The embodiment has been described above in which the reference fuel chamber CR of the minimum pressurizing check valve 170 communicates with the inlet (point $P_I$) of the fuel supply system 100 through the reference fuel port 172r and the reference fuel pipe TR, but the reference fuel chamber CR of the minimum pressurizing check valve 170 may communicate with the inlet (point $P_L$) of the high-pressure pump 120.

Further, the embodiment has been described above in which the temperature sensor ST is provided at the point $P_L$ on the fuel flow passage between the low-pressure pump 110 and the high-pressure pump 120, but the temperature sensor ST may be provided at the inlet (point $P_I$) of the fuel supply system 100.

Furthermore, the embodiment has been described above in which the opening degree of the main fuel outflow port 172o of the minimum pressurizing check valve 170 is 0% when the differential pressure between the pressure in the main fuel chamber CM and the pressure in the reference fuel chamber CR is equal to the first threshold $\Delta P_1$, and is 100% when the differential pressure therebetween is equal to the second threshold $\Delta P_2$, but these opening degrees may be 0% or more, and may be 100% or less, respectively.

As described above, the fuel supply system 100 of the aircraft gas turbine engine according to the embodiment of the present disclosure employs the minimum pressurizing check valve 170 having the main fuel outflow port 172o configured such that the opening degree thereof is in the range of 0 to 100% even when the discharge pressure of the boost pump 220 of the aircraft 200 changes while the internal leak model of the high-pressure pump 120 is identified, and thus it is possible to keep the differential pressure $\Delta P_T$ between the system inlet (point $P_I$) and the minimum pressurizing check valve 170 constant during this time, making it possible to identify the internal leak model described above with high accuracy.

(Aspects of Present Disclosure)

A fuel supply system according to a first aspect of the present disclosure includes: a gear pump that increases a pressure of fuel flowing in from a system inlet and discharges the fuel; a metering section that is disposed downstream of the gear pump and includes an orifice and a check valve connected in parallel with each other; a minimum pressurizing check valve that is disposed between the metering section and a system outlet; and a controller, wherein the check valve closes when a rotation speed of the gear pump is less than an upper threshold, and opens when the rotation speed of the gear pump is equal to or more than the upper threshold, the minimum pressurizing check valve includes a cylinder and a piston capable of being movable back and forth in the cylinder, the cylinder has an internal space partitioned by the piston into a first chamber that communicates with an outlet of the metering section through an inflow port and a second chamber that communicates with the system inlet, the piston receives a force in a direction toward the first chamber from a spring disposed in the second chamber, a side wall of the cylinder is provided with an outflow port that is an opening through which the inflow port and the system outlet communicate with each other, an opening degree of the outflow port is adjusted as the piston moves back and forth, and the minimum pressurizing check valve keeps a differential pressure between the system inlet and the outlet of the metering section constant when the rotation speed of the gear pump is equal to or more than a lower threshold and is equal to or less than an intermediate threshold, the lower threshold being smaller than the upper threshold, the intermediate threshold being more than the lower threshold and smaller than the upper threshold.

In a fuel supply system according to a second aspect of the present disclosure, the minimum pressurizing check valve is capable of variably adjusting an opening degree of the outflow port in a range of 0 to 100% when the rotation speed of the gear pump is equal to or more than the lower threshold and is equal to or less than the intermediate threshold.

In a fuel supply system according to a third aspect of the present disclosure, the opening degree of the outflow port is 0% or more when the rotation speed of the gear pump is equal to the lower threshold and a pressure at the system inlet is higher by a predetermined maximum deviation than a median of fluctuations to be assumed, and the opening degree of the outflow port is 100% or less when the rotation speed of the gear pump is equal to the intermediate threshold and the pressure at the system inlet is lower by the maximum deviation than the median of the fluctuations.

A fuel supply method according to a first aspect of the present disclosure is performed using the fuel supply system according to any one of the first to third aspects; in the fuel supply method, when the rotation speed of the gear pump is equal to or more than the lower threshold and is less than the upper threshold, the controller controls the rotation speed of the gear pump based on a fuel flow rate to be measured using the orifice, when the rotation speed of the gear pump is equal to or more than the lower threshold and is equal to or less than the intermediate threshold, the controller identifies an internal leak model of the gear pump based on the fuel flow rate to be measured using the orifice, and when the rotation speed of the gear pump is equal to or more than the upper threshold, the controller controls the rotation speed of the gear pump based on a fuel flow rate to be estimated using the rotation speed of the gear pump and the internal leak model of the gear pump that has been identified.

A fuel supply system for a gas turbine according to a first aspect of the present disclosure includes: a pump; a reference pressure acquisition portion that acquires a reference pressure upstream of the pump; a branch provided downstream of the pump; a check valve provided downstream of the branch; a parallel flow passage provided in parallel with the check valve through the branch; a flowmeter that measures a flow rate based on the parallel flow passage; and a minimum pressurizing check valve provided downstream of the parallel flow passage, wherein the minimum pressurizing check valve includes an outflow port of which opening area increases as a difference between a pressure of inflowing fuel and the reference pressure increases, and the check valve switches to a state where fuel is capable of flowing through the outflow port as a load of the pump increases.

In a fuel supply system for a gas turbine according to a second aspect of the present disclosure, the minimum pressurizing check valve includes: a cylinder provided with the outflow port; a piston movable within the cylinder; and a first chamber and a second chamber in the cylinder partitioned by the piston, wherein the second chamber is connected to the reference pressure acquisition portion to acquire a reference pressure, fuel being increased in pressure through the pump flows into the first chamber, the piston is attached with a member that applies a restoration force toward the first chamber from the second chamber, and the piston is movable to a position covering at least a part of the outflow port.

In a fuel supply system for a gas turbine according to a third aspect of the present disclosure, the outflow port is covered and closed by the piston when the pump is not driven.

A leak model identification method according to a first aspect of the present disclosure is performed using the fuel supply system for a gas turbine according to any one of the first to third aspects, the method including: a step of driving the pump; and a step of identifying a leak model, based on the flow rate and the load of the pump under a load in which the pump does not allow fuel to flow through the check valve.

EXPLANATION OF REFERENCE SIGNS 100 fuel supply system
120 high-pressure pump (gear pump)
140 orifice
150 pressurizing valve (check valve)
160 metering section
170 minimum pressurizing check valve
172 cylinder
172o main fuel outflow port (outflow port)
174 piston
176 spring
180 controller
CM main fuel chamber (first chamber)
CR reference fuel chamber (second chamber)
$N_1$ lower threshold of rotation speed
$N_2$ intermediate threshold of rotation speed
$N_3$ upper threshold of rotation speed
$P_I$ inlet of fuel supply system
$P_M$ outlet of metering section

The invention claimed is:

1. A fuel supply system comprising:
a gear pump that increases a pressure of fuel flowing in from a system inlet and discharges the fuel;
a metering section that is disposed downstream of the gear pump and includes an orifice and a check valve connected in parallel with each other;
a minimum pressurizing check valve that is disposed between the metering section and a system outlet; and
a controller, wherein
the check valve closes when a rotation speed of the gear pump is less than an upper threshold, and opens when the rotation speed of the gear pump is equal to or more than the upper threshold,
the minimum pressurizing check valve includes a cylinder and a piston movable back and forth in the cylinder,
the cylinder has an internal space partitioned by the piston into a first chamber that communicates with an outlet of the metering section through an inflow port and a second chamber that communicates with the system inlet, the piston receiving a force in a direction toward the first chamber from a spring disposed in the second chamber,
a side wall of the cylinder is provided with an outflow port that is an opening through which the inflow port and the system outlet communicate with each other, an opening degree of the outflow port is adjusted as the piston moves back and forth, and
the minimum pressurizing check valve keeps a differential pressure between the system inlet and the outlet of the metering section constant and variably adjusts an opening degree of the outflow port in a range of 0 to 100% when the rotation speed of the gear pump is equal to or more than a lower threshold and is equal to or less than an intermediate threshold, the lower threshold being smaller than the upper threshold, the intermediate threshold being more than the lower threshold and smaller than the upper threshold,
the opening degree of the outflow port is 0% or more when the rotation speed of the gear pump is equal to the lower threshold and a pressure at the system inlet is higher by a predetermined maximum deviation than a median of fluctuations to be assumed, and
the opening degree of the outflow port is equal to 100% or less when the rotation speed of the gear pump is equal to the intermediate threshold and the pressure at the system inlet is lower by the predetermined maximum deviation than the median of the fluctuations.

2. A fuel supply method using the fuel supply system according to claim 1, wherein
when the rotation speed of the gear pump is equal to or more than the lower threshold and is less than the upper threshold, the controller controls the rotation speed of the gear pump based on a fuel flow rate to be measured using an orifice flowmeter including a differential pressure gauge connected in parallel with the orifice,
when the rotation speed of the gear pump is equal to or more than the lower threshold and is equal to or less than the intermediate threshold, the controller identifies an internal leak model of the gear pump based on the fuel flow rate to be measured using the orifice flowmeter, and
when the rotation speed of the gear pump is equal to or more than the upper threshold, the controller controls the rotation speed of the gear pump based on a fuel flow rate to be estimated using the rotation speed of the gear pump and the internal leak model of the gear pump that has been identified.

* * * * *